(No Model.)
C. W. ELLIS.
FLY SCREEN.
No. 270,037. Patented Jan. 2, 1883.
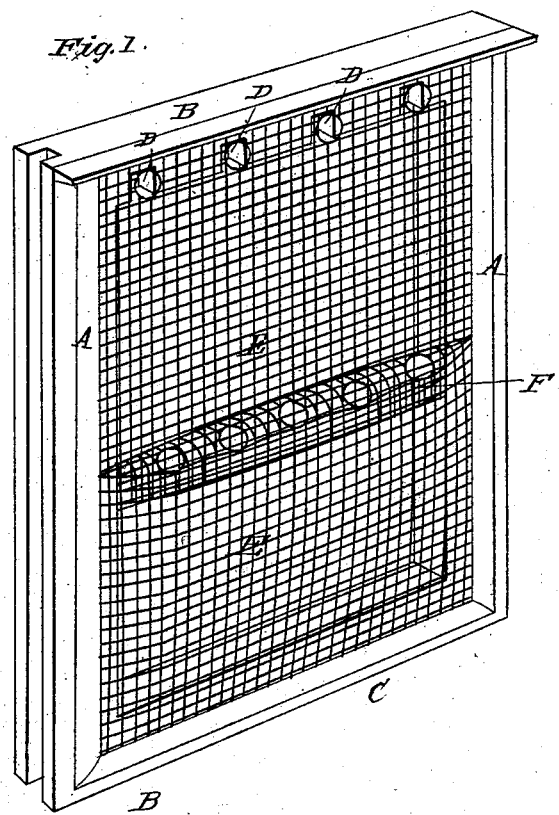
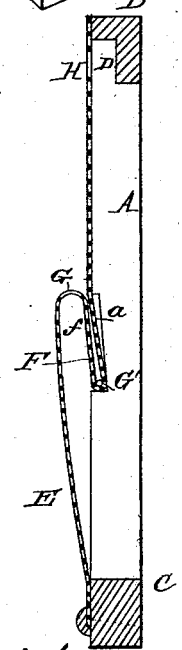
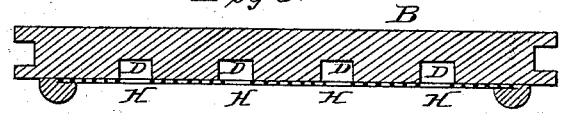
WITNESSES:
Fred. G. Dieterich
Bennett S. Jones
Charles W. Ellis,
INVENTOR.
by Louis Bagger & Co.
ATTORNEYS.

UNITED STATES PATENT OFFICE.

CHARLES W. ELLIS, OF PEORIA, ILLINOIS.

FLY-SCREEN.

SPECIFICATION forming part of Letters Patent No. 270,037, dated January 2, 1883.

Application filed September 30, 1882. (No model.)

*To all whom it may concern:*

Be it known that I, CHARLES W. ELLIS, of Peoria, in the county of Peoria and State of Illinois, have invented certain new and useful Improvements in Fly-Screens; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the outside of one of my improved fly-screens. Fig. 2 is a vertical cross-section of the same, and Fig. 3 is a longitudinal section through the upper cross-piece of the frame.

Similar letters of reference indicate corresponding parts in all the figures.

My invention has relation to fly-screens for the windows or doors of houses, or for cheese-safes, meat-safes, and similar receptacles for provisions; and it consists in the construction of a screen which, while effectually preventing flies from entering the house from without, permits the flies in the house to escape through the screen, which therefore I appropriately call a "fly-exit screen."

In the accompanying drawings, A A are the sides, B the top piece, and C the bottom piece, of the screen-frame. The top piece, B, has a series of mortises or recesses, D, placed any suitable distance apart on the side facing the screen, shown at E. The latter is fastened upon the frame A A B C in any suitable manner, and has one or more folds, F, formed by doubling the wire-netting and overlapping it upon itself on the inner side of the screen. In large screens I insert a stiff wire, G', through the overlapping part of the fold, to prevent it from sagging. While only one fold is shown on the drawings, two, three, or more may be used, arranged in parallel rows at any desired distance apart from one another, according to the height of the screen. These folds form pockets *f*, provided each with a series of apertures, G, of suitable shape and size, either oblong, round, or square, and placed any suitable distance apart in the top of the pocket formed by the bend in the fold. To accommodate or make room for the ends of the fold, the sides A A of the frame may be rabbeted, as shown at *a a*, so that the ends of the folds or pockets will not bulge out and interfere with the appearance or working of the screen. The upper end of the screen, where it is fastened to the top bar, B, has a row of apertures, H, registering with the recesses D in said bar.

In operation, the flies which from the inside light upon the screen will crawl in an upward direction, flies having a well-known tendency always to crawl up. Those that light below the fold will therefore crawl into the pocket *f*, and following this in the direction of its length will escape through one of the apertures G. Those who light above the uppermost fold in the screen, when they reach the top bar, B, will crawl along the under side of this, and escape through one of the notches or recesses D and apertures H. The flies are naturally attracted to the screen by the light from without, and in a short time the house, safe, &c., will be cleared of flies, while these insects have never been known to enter from the outside through the exit-apertures G and H.

Having thus described my invention, I claim and desire to secure by Letters Patent of the United States—

The fly-exit screen herein shown and described, consisting of the frame A A B C, having recesses D and rabbets *a*, and netting E, having the pockets *f* and apertures G and H, constructed and arranged substantially as and for the purpose shown and set forth.

In testimony that I claim the foregoing as my own I have hereunto affixed my signature in presence of two witnesses.

CHARLES W. ELLIS.

Witnesses:
JOSIAH CRATTY,
ALMON K. VIRGIL.